United States Patent
Miyajima et al.

(10) Patent No.: US 6,888,656 B2
(45) Date of Patent: May 3, 2005

(54) OPTICAL DEFLECTOR

(75) Inventors: Hiroshi Miyajima, Hachioji (JP);
Masanori Ogata, Matsumoto (JP);
Yukihiro Aoki, Okaya (JP); Yoshiro Nishimura, Okaya (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 09/990,658

(22) Filed: Nov. 16, 2001

(65) Prior Publication Data

US 2002/0060830 A1 May 23, 2002

(30) Foreign Application Priority Data

Nov. 20, 2000 (JP) .................................... 2000-353145
Sep. 25, 2001 (JP) .................................... 2001-292165

(51) Int. Cl.⁷ ............................................. G02B 26/08
(52) U.S. Cl. ..................................... 359/224; 359/198
(58) Field of Search ................................. 359/225, 226, 359/224, 198, 199, 200, 212

(56) References Cited

U.S. PATENT DOCUMENTS

| | | | |
|---|---|---|---|
| 5,748,172 A | 5/1998 | Song et al. .................. | 345/111 |
| 6,122,089 A | 9/2000 | Minamoto et al. .......... | 359/198 |
| 6,201,629 B1 * | 3/2001 | McClelland et al. ........ | 359/223 |
| 6,388,789 B1 * | 5/2002 | Bernstein .................... | 359/198 |

FOREIGN PATENT DOCUMENTS

| | | | |
|---|---|---|---|
| EP | 0 686 863 A1 | 12/1995 | .......... G02B/26/10 |
| EP | 0 778 657 A1 | 6/1997 | .......... H02K/33/18 |
| EP | 1 087 248 A1 | 3/2001 | .......... G02B/26/10 |
| JP | 2001-125036 | 5/2001 | |
| WO | WO 00/50950 | * 8/2000 | .......... G02B/26/10 |

OTHER PUBLICATIONS

Patent Abstract of Japan Publication No. 62210418, published Sep. 16, 1987.
Patent Abstracts of Japan Publication No. 01195414, published Aug. 7, 1989.

* cited by examiner

*Primary Examiner*—Euncha P. Cherry
(74) *Attorney, Agent, or Firm*—Scully, Scott, Murphy & Presser

(57) ABSTRACT

There is disclosed an optical deflector comprising a mirror structure having a first and second surfaces in a front/back relation, single plate base for holding the mirror structure, and a driver for driving the mirror structure. The mirror structure comprises a pair of supports, a movable plate, and a pair of elastic members for connecting the movable plate and the supports, such that the movable plate is able to rock with respect to the supports. The movable plate has a mirror surface on the second surface. The base has an opening for exposing the mirror surface. The supports of the mirror structure are fixed to the base with the second surfaces of the supports in contact therewith. The driver includes a conductive element formed on the first surface of the movable plate, and magnetic field generating elements fixed on the base.

13 Claims, 8 Drawing Sheets

OPTICAL DEFLECTOR

CROSS-REFERENCE TO RELATED APPLICATIONS

This application is based upon and claims the benefit of priority from the prior Japanese Patent Applications No. 2000-353145, filed Nov. 20, 2000; and No. 2001-292165, filed Sep. 25, 2001, the entire contents of both of which are incorporated herein by reference.

BACKGROUND OF THE INVENTION

1. Field of the Invention

The present invention relates to an optical deflector which changes a direction of a mirror surface irradiated with a light beam to change the direction of a reflected light beam.

2. Description of the Related Art

A concept of manufacturing an optical deflector by silicon micro-machining was presented by K. Petersen around 1980. In recent years, a practical optical deflector has been developed, and a remarkable progress has also been made in a manufacturing process. However, presently, it cannot be said that there is an established method regarding a mounting technique.

The present applicant has disclosed an electromagnetic driving type optical deflector in U.S. Pat. No. 6,122,089. This deflector will be described hereinafter with reference to FIGS. 13 to 15.

The optical deflector includes an optical deflector mirror portion 100 formed of a single-crystal silicon substrate, and the optical deflector mirror portion 100 includes a movable plate 101, a pair of elastic members 102 and a pair of supports 103. The movable plate 101 has a driving coil 104 on a lower surface thereof (lower surface in FIGS. 14 and 15), and a mirror surface 106 on an upper surface thereof (upper surface in FIGS. 14 and 15).

As shown in FIG. 15, the support 103 of the optical deflector mirror portion 100 is bonded/fixed to a U-shaped fixing member 111. In order to prevent the fixing member 111 from blocking a light beam incident upon the mirror surface 106 and a light beam reflected by the mirror surface 106, the optical deflector mirror portion 100 is attached to the fixing member 111 in such a manner that the surface of the movable plate with the driving coil 104 formed thereon necessarily turns to the fixing member.

The optical deflector further includes a magnetic circuit including a permanent magnet 108 and magnetic yokes 109, 110. As shown in FIG. 14, the magnetic yoke 110 extends in the vicinity of the movable plate 101 through the fixing member 111 in order to apply a high magnetic field to the driving coil 104.

In mirror structures such as the optical deflector mirror portion 100, the surface of the support on a driving coil side is utilized as a bonding surface with the fixing member. Since a power supply pad for the driving coil is usually formed on the surface of the support on the driving coil side, it is difficult to secure a flat surface with an area sufficient for bonding.

Moreover, in the mirror structure the support is bonded to the fixing member with the power supply pad directed to the fixing member. Therefore, in order to draw wiring out of the power supply pad, an anisotropic conductive film (ACF), and the like need to be used to connect wiring materials such as a flexible wiring board (FPC) to the mirror structure before bonding the structure to the fixing member. This restriction deteriorates operation efficiency during bonding to the fixing member, and also deteriorates positioning precision.

Furthermore, since the surface of the mirror structure on the driving coil side is attached to the fixing member, the magnetic yoke or the fixing member needs to be processed in a complicated shape in order to dispose the magnetic yoke in the vicinity of the driving coil.

BRIEF SUMMARY OF THE INVENTION

An object of the present invention is to provide an optical deflector superior in manufacturing properties. Another object of the present invention is to provide an optical deflector in which a mirror structure can be mounted with high reliability, satisfactory operation efficiency, and high positioning precision. A further object of the present invention is to provide an optical deflector in which a magnetic circuit can easily be prepared and attached.

According to the present invention, there is provided an optical deflector comprising: a mirror structure; a base for holding the mirror structure; and driving means for driving the mirror structure. The mirror structure comprises a pair of supports fixed to the base, a movable plate which is moved with respect to the support, and a pair of elastic members for connecting the movable plate to the support. The movable plate can rock with respect to the support using the pair of elastic members as a rocking axis. The mirror structure has a first surface and a second surface in a front/back fashion, the driving means includes a conductive element formed on the first surface of the movable plate, the movable plate has a mirror surface formed on the second surface, the supports are fixed to the base with the second surface of the supports in contact with the base, and the base has an opening for exposing the mirror surface.

The supports preferably comprise electrode pads electrically connected to the conductive element, the base has wiring materials for electric connection to the outside, the wiring materials have connection portions electrically connected to the electrode pads, and the electrode pads are electrically connected to the connection portions by wire bonding.

The conductive element is, for example, a coil extending along a peripheral edge of the movable plate, the driving means has a magnetic circuit for applying a magnetic field to the coil, and the movable plate is driven using an electromagnetic force acting between the coil and the magnetic circuit. The magnetic circuit comprises a pair of permanent magnets and a yoke of magnetic material, and at least a part of the yoke is disposed in the vicinity of the first surface of the movable plate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described hereinafter with reference to the drawings.

Figure 1:
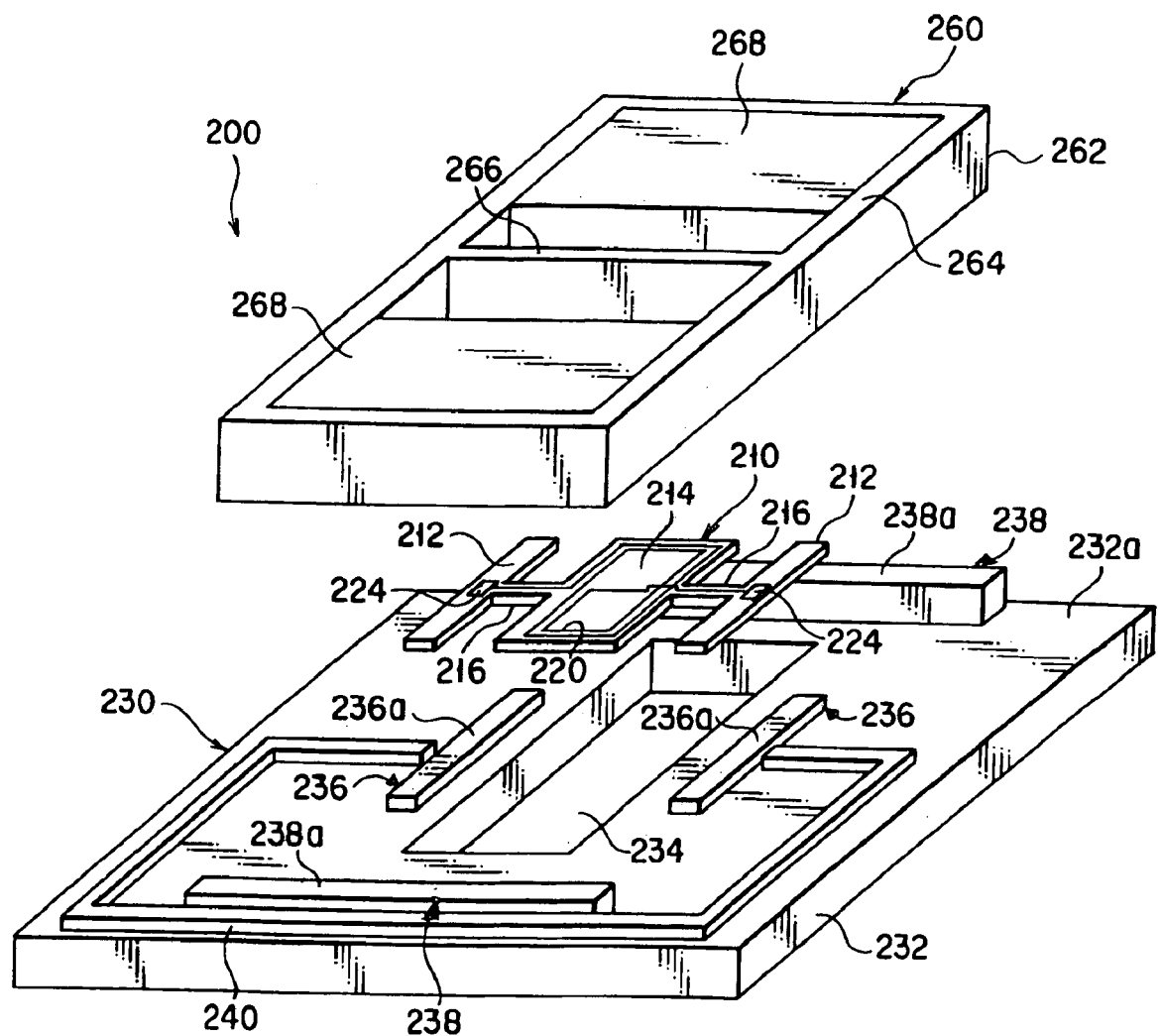
FIG. 1 is an exploded perspective view of an electromagnetic driving type optical deflector according to one embodiment of the present invention.

An electromagnetic driving type optical deflector according to the embodiment of the present invention is shown in FIG. 1. As shown in FIG. 1, an optical deflector 200 includes a mirror chip 210 as a mirror structure, a base 230 for holding the mirror chip 210, and a magnetic circuit 260 for driving the mirror chip 210.

Figure 2:
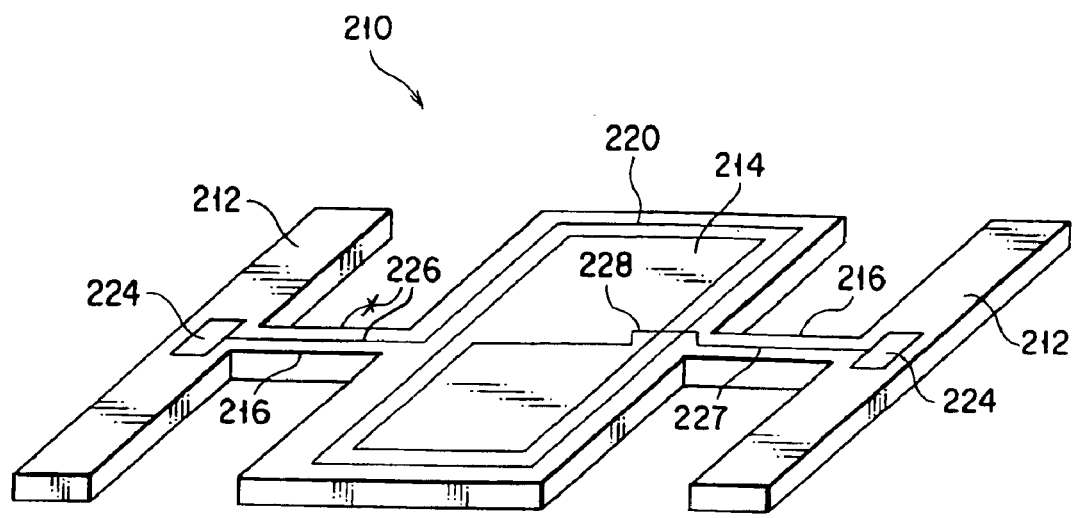
FIG. 2 is an enlarged perspective view of a mirror chip of FIG. 1.

As shown in detail in FIG. 2, the mirror chip 210 includes a pair of supports 212, a movable plate 214 which is moved with respect to the supports 212, and a pair of elastic members 216 for connecting the movable plate 214 to the supports 212. The movable plate 214 can rock with respect to the supports 212 about the pair of elastic members 216 as a rocking axis. In other words, the movable plate 214 is rockably center-supported with respect to the supports 212 by the pair of elastic members 216.

The mirror chip 210 has two surfaces which are in a front/back relation, for example, a first surface seen in FIG. 2, and a second surface as a back side of the first surface. The movable plate 214 includes a conductive element 220 formed on the first surface, and a mirror surface 218 formed on the second surface. The conductive element 220 is, for example, a coil disposed along a peripheral edge of the movable plate 214, which is not limited.

The pair of supports 212 include a pair of electrode pads 224. One (left) electrode pad 224 is electrically connected to an outer end of the coil 220 via a wiring 226 extending through one (left) elastic member 216. The other (right) electrode pad 224 is electrically connected to an inner end of the coil 220 via a wiring 227 extending through the other (right) elastic member 216 and a jump wiring 228 crossing over the coil 220 disposed along the peripheral edge of the movable plate 214.

The mirror chip 210 is prepared from a single-crystal silicon substrate, for example, using a semiconductor manufacturing technique. That is, the coil 220, electrode pad 224, and wirings 226, 227 are formed as plane circuit elements in planar shapes, and the jump wiring 228 is formed, for example, utilizing a multilayered wiring technique. However, the mirror chip 210 is not limited to this. For example, in addition to the single-crystal silicon substrate, other materials such as polycrystalline silicon, silicon compounds, and organic materials may be used to prepare the chip. Moreover, the chip may be prepared from substrates other than the single-crystal silicon substrate. Furthermore, the chip may be prepared by techniques other than the semiconductor manufacturing technique.

As shown in FIG. 1, the base 230 comprises a main substrate 232, a pair of bonding portions 236 to which the mirror chip 210 is bonded, a pair of attachment portions 238 to which the magnetic circuit 260 is attached, and a rigid substrate 240 fixed to the main substrate 232. The main substrate 232 has an opening 234 for exposing the mirror surface 218 formed on the movable plate 214 of the mirror chip 210.

The main substrate 232 has a plane 232a, which faces the second surface of the mirror chip 210. Each of the bonding portions 236 projects from the plane 232a of the main substrate 232, and has a flat bonding surface 236a disposed substantially in parallel to the plane 232a. Similarly, each of the attachment portions 238 projects from the plane 232a of the main substrate 232, and has a flat attachment surface 238a disposed substantially in parallel to the plane 232a. The bonding portions 236 and attachment portions 238 are integrally formed, for example, with the main substrate 232, but may be separate members fixed to the main substrate 232 by means such as adhesion.

The rigid substrate 240 is a wiring substrate having wirings for electric connection to the outside. The wiring substrate 240 is within the plane 232a of the main substrate 232. That is, the wiring substrate 240 does not project from the main substrate 232. This effectively prevents disconnection by contact with other members during assembly of the optical deflector. The wiring substrate 240 is elongated and extended substantially in a U shape, and has opposite ends thereof positioned in the vicinity of the bonding portions 236.

Figure 3:
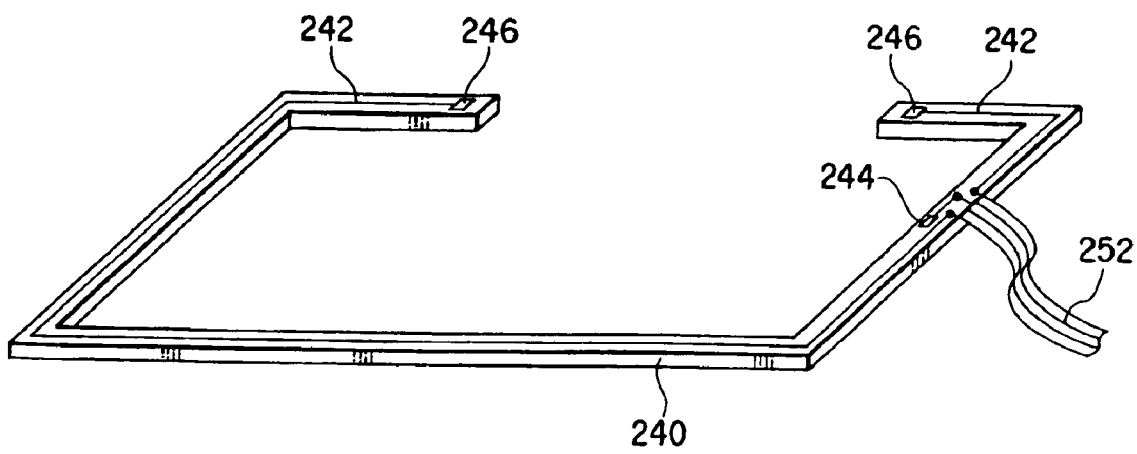
FIG. 3 is an enlarged perspective view of a wiring substrate of FIG. 1, showing that a lead wire is connected to the wiring substrate.

As shown in FIG. 3, the wiring substrate 240 includes a pair of wirings 242 for electric connection to the electrode pads 224 of the mirror chip 210, and a ground wiring (GND wiring) 244 for grounding. The pair of wirings 242 extend along the wiring substrate 240, and have opposite ends electrically connected to bonding pads 246 positioned on ends of the wiring substrate 240.

The GND wiring 244 is connected to a GND pad disposed on the front side of the wiring substrate 240, and is further connected to a GND pad disposed on the back side of the wiring substrate 240 via a through hole. For example, the main substrate 232 has conductivity, the wiring substrate 240 is fixed to the main substrate 232 using a conductive adhesive, and the GND pad on the back side of the wiring substrate 240 is electrically connected to the main substrate 232.

In FIG. 3, the respective wirings 242, 244 of the wiring substrate 240 are soldered and connected to a flexible lead wire 252 for electric connection to external apparatuses such as a driving control circuit. That is, the base 230 has the flexible lead wire 252 connected to the wirings 242, 244 of the wiring substrate 240. The wiring substrate 240 is connected to the external apparatuses of the optical deflector, such as the driving control circuit, via the lead wire 252. The connection to the external apparatus using the lead wire 252 is appropriate for the optical deflector which is relatively distant from the external apparatus. When a length of the lead wire 252 is adjusted, the connection can advantageously be applied to a broad range of layouts of the optical deflector and external apparatus.

Figure 4:
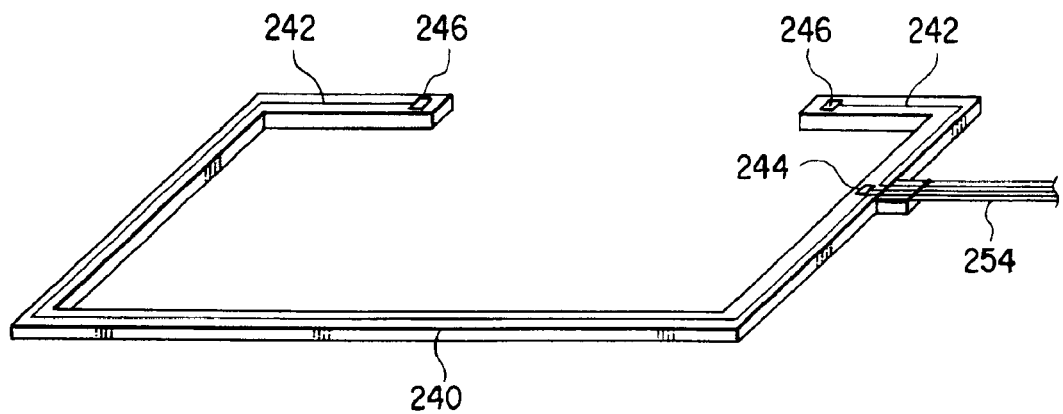
FIG. 4 is an enlarged perspective view of the wiring substrate of FIG. 1, showing that a flexible substrate is integrally formed with the wiring substrate.

However, a mode of electric connection to the external apparatus is not limited to this. For example, as shown in FIG. 4, the wirings 242, 244 of the wiring substrate 240 may electrically be connected to a flexible substrate 254 formed integrally with the wiring substrate 240. That is, the base 230 may include the flexible substrate 254 integrally formed with the wiring substrate 240. The wiring substrate 240 is connected to the external apparatus via the flexible substrate 254. The connection to the external apparatus using the flexible substrate 254 is appropriate for the optical deflector which is disposed in the vicinity of the external apparatus. This has an advantage that connecting operations required for the lead wire, such as a soldering operation, are unnecessary.

Figure 5:
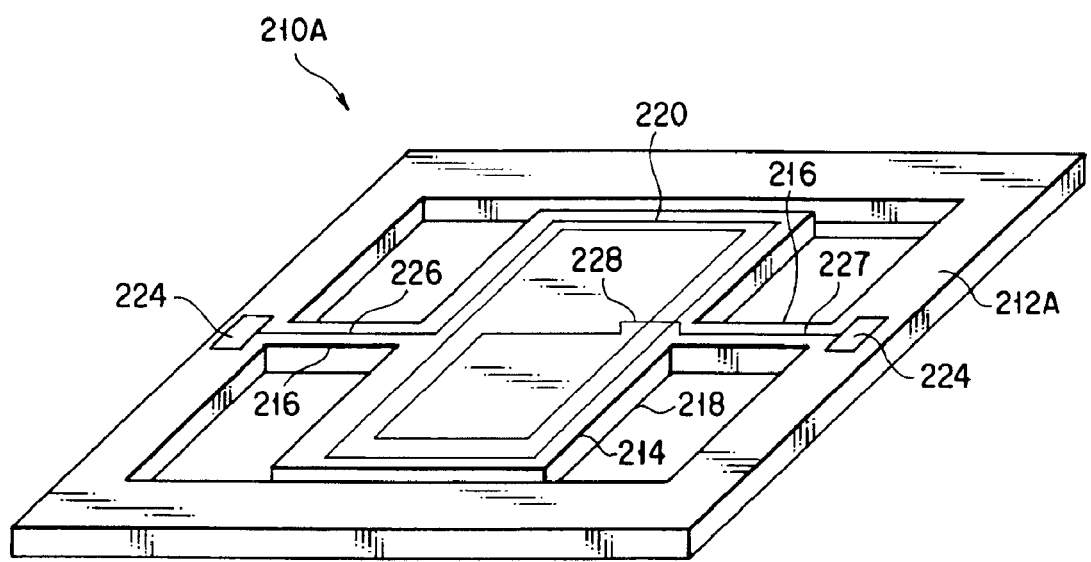
FIG. 5 is a perspective view showing the mirror chip before being assembled.
Figure 6:
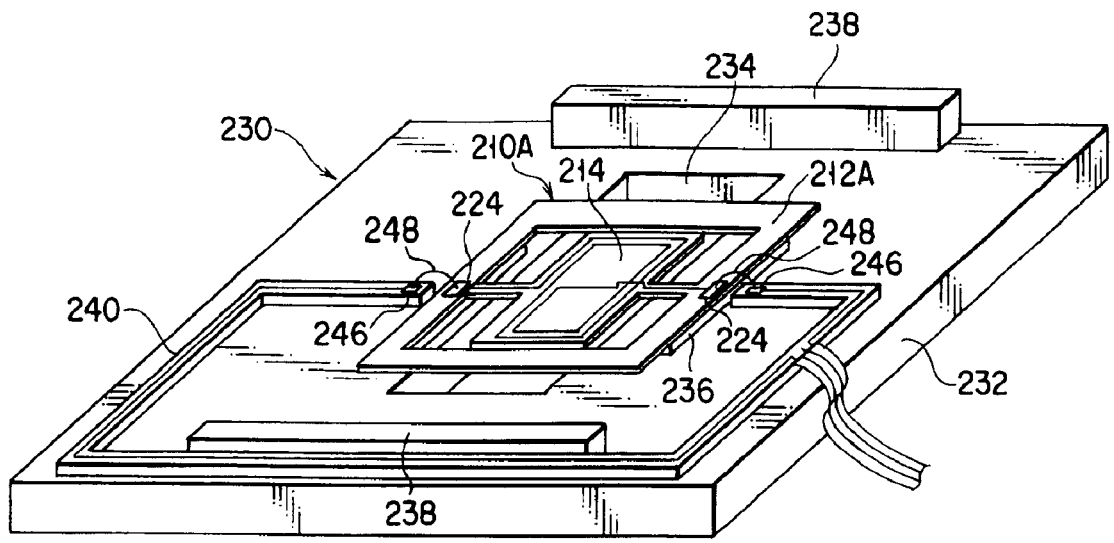
FIG. 6 is a perspective view of a base to which the mirror chip before assembly in FIG. 5 is bonded.
Figure 7:
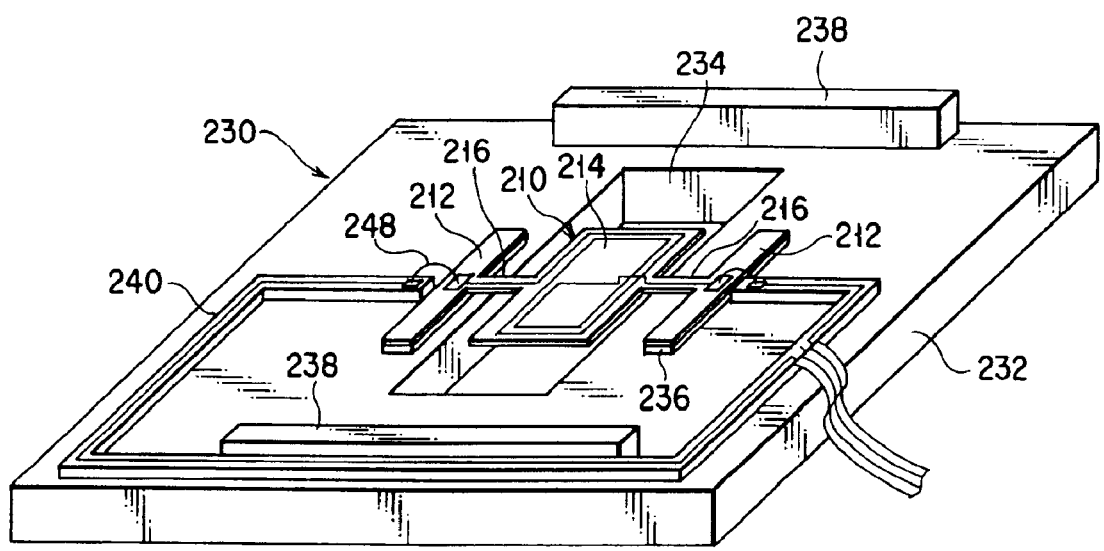
FIG. 7 is a perspective view of the base whose support of the mirror chip before assembly in FIG. 6 is partially removed.

A mirror chip 210A before assembly is shown in FIG. 5. The mirror chip 210A before assembly includes a frame-shaped support 212A which surrounds the movable plate 214. As shown in FIG. 6, when a part of the second surface of the support 212A is bonded to the bonding surfaces 236a (see FIG. 1) of the bonding portions 236, the mirror chip 210A before assembly is fixed to the base 230. Thereafter, as shown in FIG. 7, unstable portions of the support 212A of the mirror chip 210A before assembly, which are not fixed to the bonding portions 236, that is, a pair of portions of the support extending in parallel to the elastic member 216 are removed. As a result, the mirror chip 210A before assembly, which has the frame-shaped support 212A, constitutes the mirror chip 210 having the pair of supports 212.

When a grooves are formed beforehand in portions to be cut, and the unnecessary portions are broken along the groove, the support 212A can partially be removed easily and steadily. The grooves are formed by a half cut in etching or dicing (cutting only a part of a wafer thickness). As described in detail in U.S. Pat. No. 6,122,089, this system is effective for disposing a permanent magnet of the magnetic circuit 260 assembled later in the vicinity of the movable plate 214.

Furthermore, as shown in FIG. 6, the electrode pads 224 of the mirror chip 210 are connected to the bonding pads 246 of the wiring substrate 240 by wire bonding. That is, the electrode pads 224 of the mirror chip 210 are electrically connected to the bonding pads 246 of the wiring substrate 240 by bonding wires 248. Additionally, the bonding wires 248 are preferably sealed by resin (not shown) in order to enhance reliability.

Figure 8:
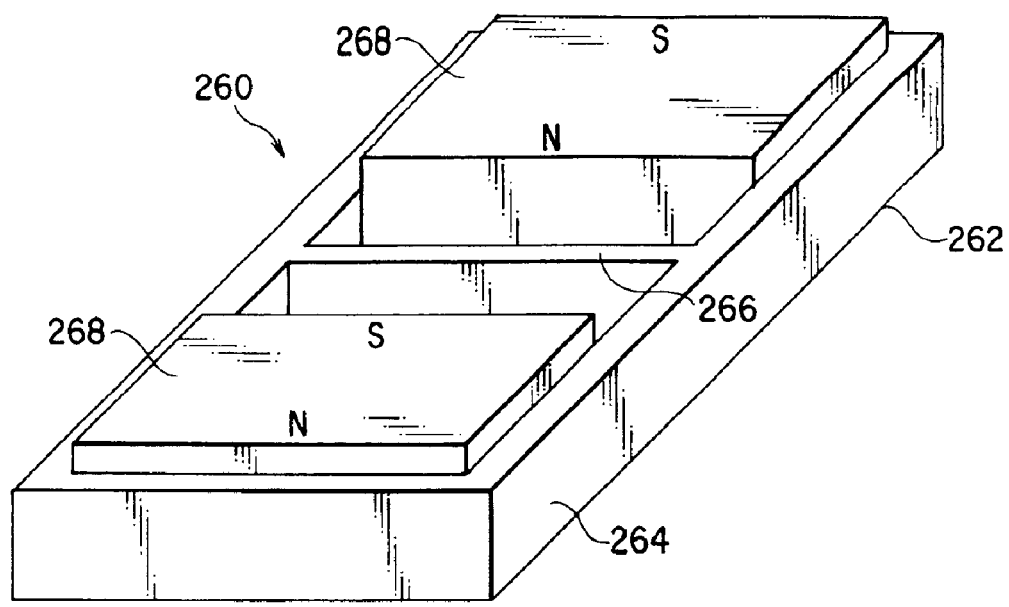
FIG. 8 is an enlarged perspective view of a magnetic circuit of FIG. 1.
Figure 9:
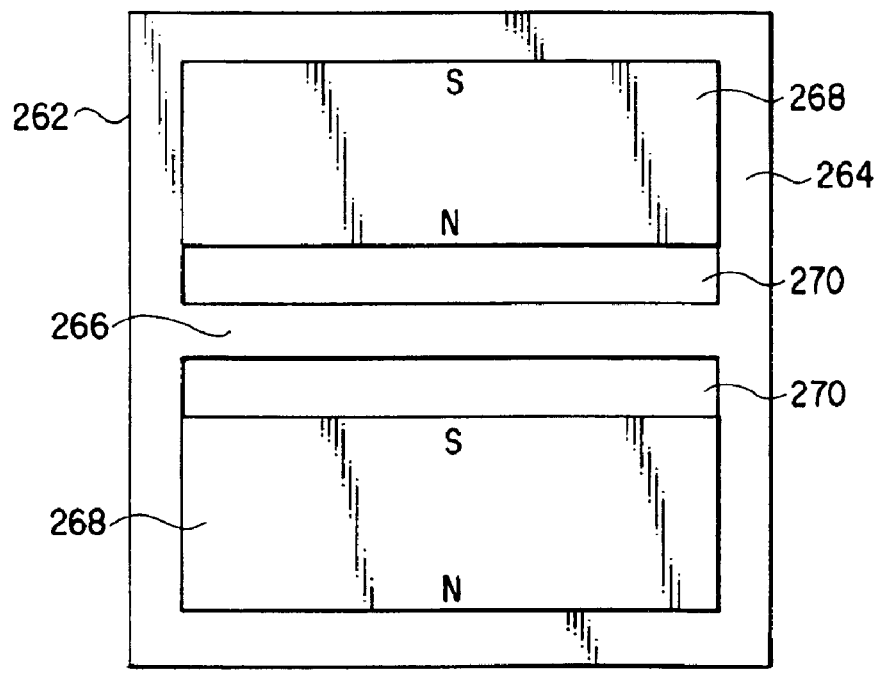
FIG. 9 is a plan view of the magnetic circuit of FIG. 8.

As shown in FIGS. 8 and 9, the magnetic circuit 260 comprises a yoke 262 of magnetic material, and a pair of permanent magnets 268. The yoke 262 has an outer yoke 264 having a rectangular frame shape, and an inner yoke 266 crossing a middle of an inner space. That is, the yoke 262 has a pair of rectangular through holes. The yoke 262 is formed, for example, by partially hollowing out the rectangular magnetic material, and making two rectangular through holes.

The pair of permanent magnets 268 are contained in a pair of through holes of the yoke 262, and fixed in contact with the outer yoke 264. As a result, gaps 270 are formed between the respective permanent magnets 268 and the inner yoke 266. The gaps 270 are called a magnetic gap. The magnetic circuit 260 having this inner yoke 266 has a higher magnetic flux density in the magnetic gap 270 as compared with a circuit having no inner yoke.

Figure 10:
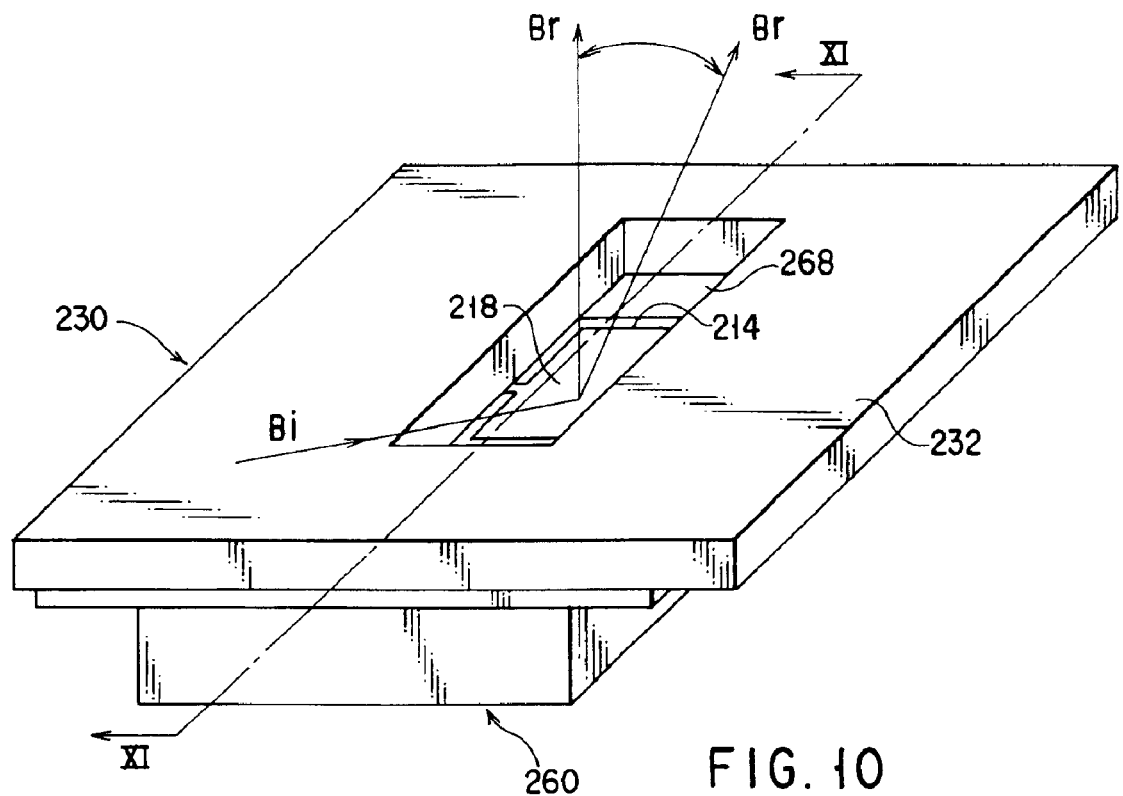
FIG. 10 is a perspective view of an assembled state of the optical deflector shown in FIG. 1.
Figure 11:
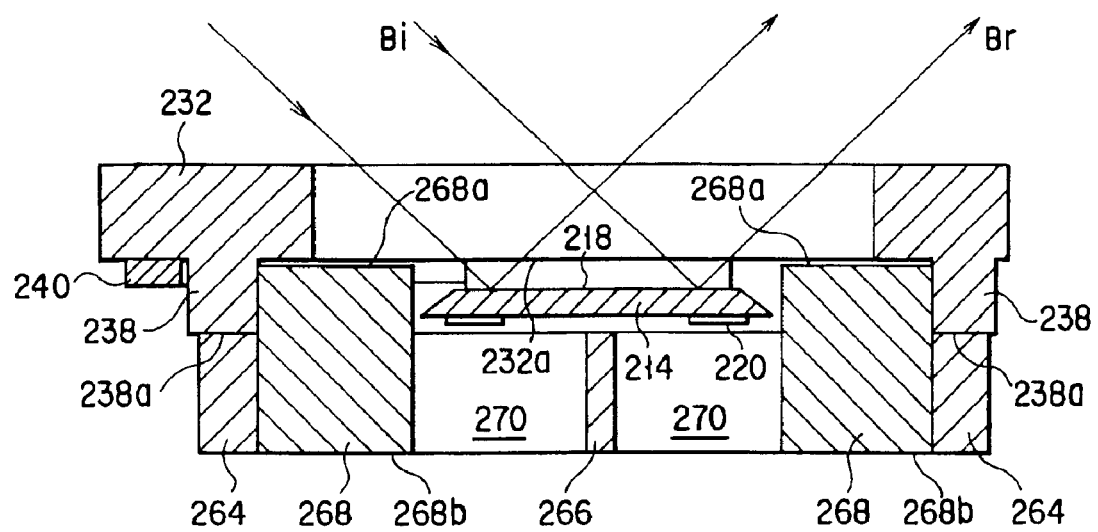
FIG. 11 is a sectional view of the optical deflector taken along line XI—XI of FIG. 10.

As shown in FIGS. 10 and 11, the magnetic circuit 260 is fixed to the attachment portions 238 of the base 230. As shown in FIG. 11, this fixing is realized, for example, by bonding a part of the yoke 262 to the attachment surfaces 238a of the attachment portions 238. That is, the magnetic circuit 260 is attached to the base 230 on the same side as a side on which the mirror chip 210 is disposed.

As shown in FIG. 11, the inner yoke 266 is positioned in the vicinity of a middle of the movable plate 214, and in the vicinity of the first surface of the movable plate 214 with the coil 220 formed thereon. Moreover, each of the permanent magnets 268 has a surface 268a closest to the main substrate 232, and a surface 268b remotest from the main substrate 232. The coil 220 of the movable plate 214 is positioned between the surfaces 268a and 268b of the permanent magnets 268 with respect to a direction of a normal to the surface 232a of the main substrate 232. In other words, the coil 220 is positioned so as to overlap the permanent magnets 268 as viewed from a direction parallel to the first and second surface of the mirror chip 210.

As a result, the coil 220 is substantially positioned in the magnetic gaps 270 between the permanent magnets 268 and the inner yoke 266 both with respect to a vertical direction to the surface 232a of the main substrate 232 and a direction extending in parallel to the vertical direction and crossing at right angles to the elastic members 216, that is, the rocking axis. The position of the coil in the vertical direction is particularly important. If the position deviates from the magnetic gaps 270, the magnetic flux density rapidly decreases. By this arrangement, the coil 220 is disposed in a high magnetic flux density.

The magnetic circuit 260 fixed to the base 230 and the coil 220 formed on the movable plate 214 constitute electromagnetic driving means for driving the mirror chip 210. In other words, the optical deflector 200 comprises electromagnetic driving means for driving the mirror chip 210. The driving means comprises the coil 220 extending along the peripheral edge of the movable plate 214, and the magnetic circuit 260 for applying the magnetic field to the coil 220. The movable plate 214 is driven by an electromagnetic force acting between the coil 220 and the magnetic circuit 260, and the direction of the plate can appropriately be changed.

As shown in FIGS. 10 and 11, the mirror surface 218 formed on the second surface of the movable plate 214 is exposed via the opening 234 formed in the main substrate 232 of the base 230. The mirror surface 218 of the movable plate 214 is illuminated with a light beam Bi through the opening 234. A direction of a light beam Br reflected by the mirror surface 218 is changed in accordance with the direction of the movable plate 214, that is, the beam is deflected.

The opening 234 of the base 230 preferably has a size that does not intercept the light beam incident upon the mirror surface 218 of a neutral time at an incidence angle of 45° over a full effective width of the mirror surface. In other words, the opening 234 preferably has a size that keeps the light beam from interception. That is, the opening 234 preferably allows the whole light beam to pass therethrough.

Moreover, the permanent magnets 268 are preferably disposed not to intercept the light beam incident upon the mirror surface 218 of the neutral time at the incidence angle of 45° over the full effective width of the mirror surface. In other words, the permanent magnets 268 are preferably disposed so as to keep the light beam from interception. Herein, the mirror surface 218 of the neutral time refers to the mirror surface 218 in a state in which the movable plate 214 is not driven at all. Moreover, the effective width of the mirror surface indicates a value obtained by subtracting a width of a portion that might have a processing error, film forming defect, or the like from a width of the movable plate 214.

Figure 12:
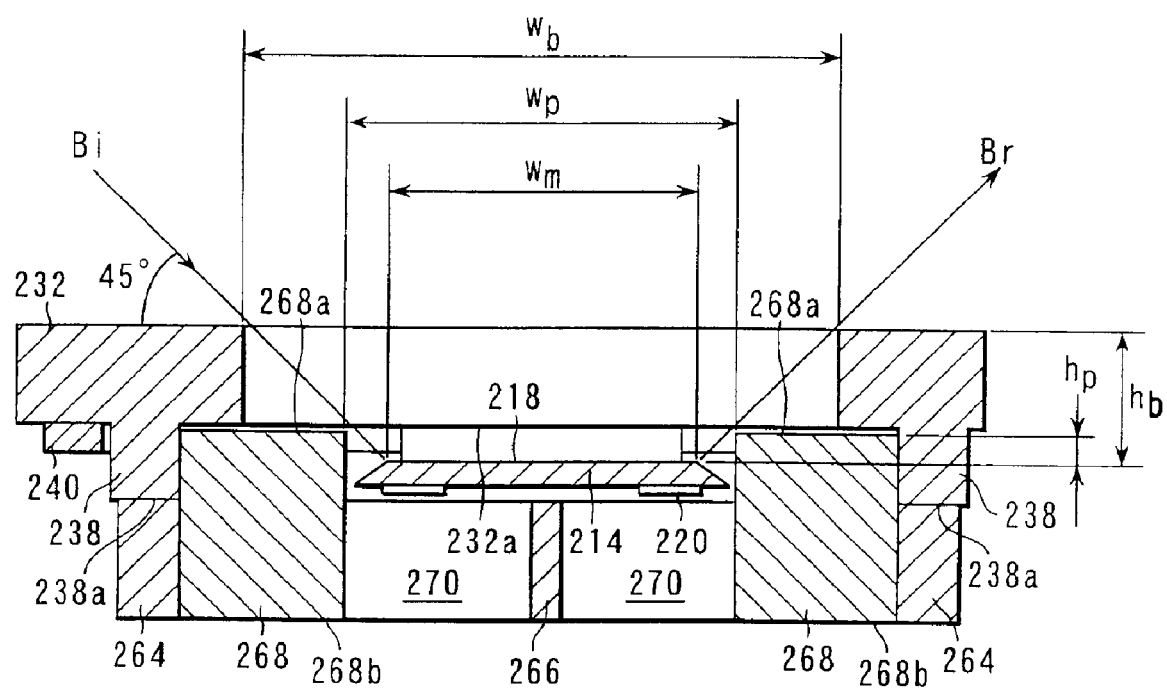
FIG. 12 is also a sectional view of the optical deflector taken along line XI—XI of FIG. 10, in which some parameters about mirror, permanent magnet, and base are entered.
Figure 13:
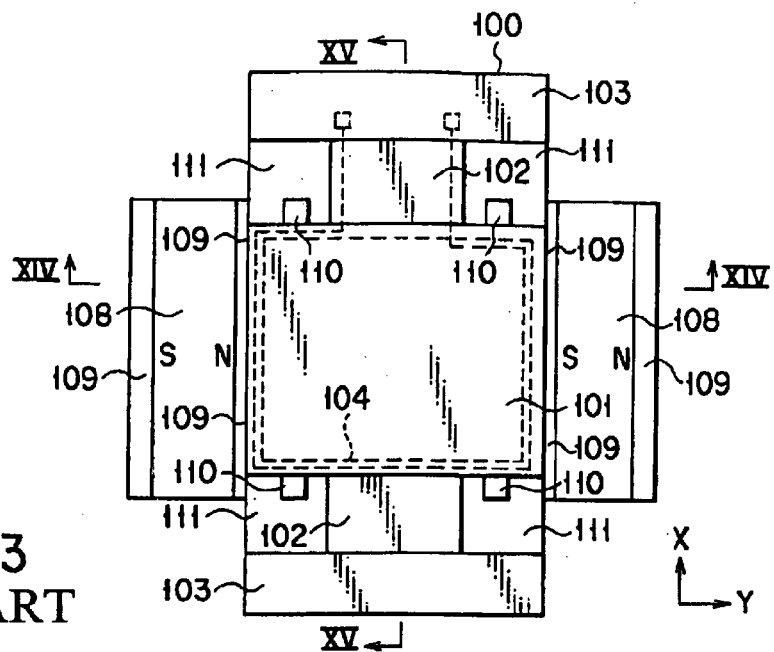
FIG. 13 is a plan view of a prior-art optical deflector.
Figure 14:
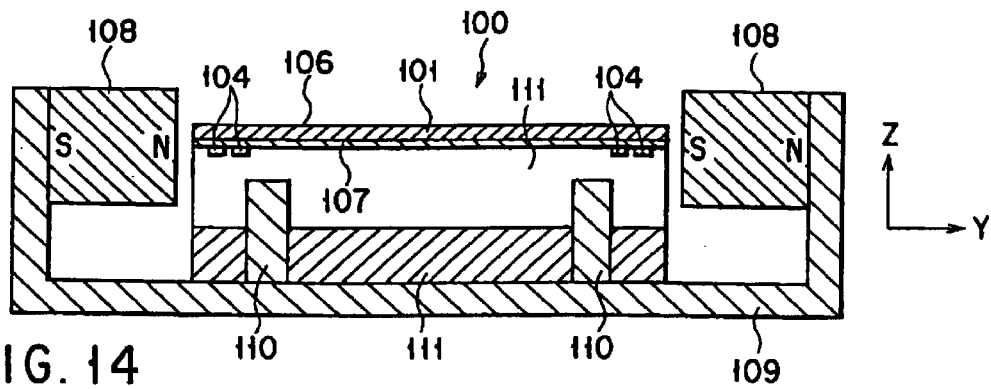
FIG. 14 is a sectional view of the optical deflector taken along line XIV—XIV of FIG. 13.
Figure 15:
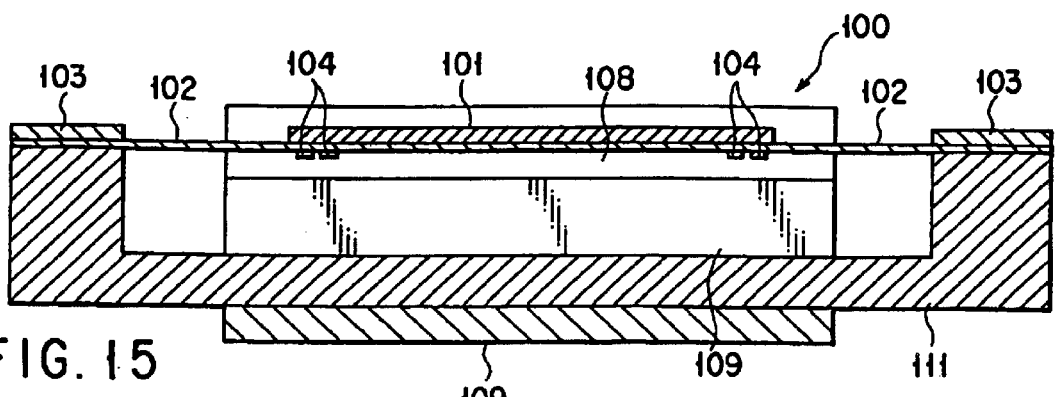
FIG. 15 is a sectional view of the optical deflector taken along line XV—XV of FIG. 13.

In order to prevent the light beam Bi incident upon the mirror surface 218 of the neutral time with the incidence angle of 45° over the full effective width of the mirror surface from being intercepted, concretely, as shown in FIG. 12, a mirror surface effective width $w_m$, permanent magnet interval $w_p$, base opening width $w_b$, height $h_p$ of the permanent magnet with respect to the mirror surface, and height $h_b$ of an upper surface of the base opening with respect to the mirror surface may satisfy conditions: $w_p > w_m + 2h_p$; and $w_b > w_m + 2h_b$.

In a layout which satisfies the conditions, the light beam reaches the mirror surface 218 without interception, and therefore there is little loss of light. The layout of the optical deflector upon which the light beam is incident at the incidence angle of 45° is a most general-purpose layout in which other optical members are easily arranged.

The present inventors actually produced the optical deflector having the mirror surface effective width $w_m$=4.3 mm (a designed value of a size of the movable plate was 4.5 mm, and a 0.1 mm peripheral area was not included in an effective area because the peripheral area possibly has the processing error, film forming defect, or the like), permanent magnet upper surface interval $w_p$=5.5 mm, base opening width $w_b$=13.2 mm, height $h_p$=0.6 mm of the permanent magnet upper surface with respect to the mirror surface, and height $h_b$=3.6 mm of the upper surface of the base opening on a trial basis. In the optical deflector produced on the trial basis, a magnetic flux density of about 0.6 (T) was obtained in a position of a driving coil.

Moreover, in a simulation in which the aforementioned respective parameters were used, a magnetic flux density of about 0.63 (T) was obtained in the position of the driving coil. This value is about 1.6 times a value of a magnetic flux of about 0.39 (T) obtained in a constitution in which the driving coil is disposed at a height corresponding to the height of the upper surface of the permanent magnet.

As can be understood from the above description, in the optical deflector of the present embodiment, the driving coil 220 is positioned between the upper and lower surfaces of the permanent magnets 268 with respect to a normal direction of the mirror surface 218, and therefore an efficiency is enhanced.

The optical deflector of the present embodiment has the following advantages.

According to the optical deflector 200 of the present embodiment, since both the mirror chip 210 and the magnetic circuit 260 are attached to the base 230 on the same side, the inner yoke can easily be disposed in the vicinity of the coil of the movable plate. That is, while the mirror chip 210 is attached to the base 230, no member exists on the surface with the coil formed thereon, that is, the first surface of the mirror chip 210. Therefore, the magnetic circuit 260 including the inner yoke 266 can easily be designed, and the magnetic circuit 260 can easily be attached.

Since the mirror chip 210 is bonded to the base 230 utilizing the second surface with the mirror surface 218 formed thereon, that is, the flat surface with no electrode formed thereon, a large bonding area can easily be secured, and the chip can firmly be fixed.

Since the mirror chip 210 is attached alone to the base 230 with the wiring substrate 240 formed beforehand thereon without requiring any wiring material, the operation efficiency is superior, and the positioning precision is enhanced. Since the mirror chip 210 is connected to the wiring substrate 240 by wire bonding, low cost and high reliability can be realized.

Respective constitutions of the present embodiment can variously be modified or changed.

For example, the optical deflector may include a detection element for detecting a speed and angle. For example, the optical deflector may include a detection coil or Hall element formed on the movable plate. Moreover, the optical deflector may include a piezo-resistance element formed on the elastic member, or an electrode, formed on the movable plate or the elastic member, for detecting a change of capacitance. In the optical deflector including the detection element, the portion of wire bonding during assembly increases, but this does not increase the difficulty in wire bonding.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An optical deflector comprising:
   a mirror structure having a first surface and a second surface which are in a front/back relation, the mirror structure comprising a pair of supports, a movable plate which is moved with respect to the supports, and a pair of elastic members for connecting the movable plate and the supports, such that the movable plate is able to rock with respect to the supports about the pair of elastic members as a rocking axis, the supports having a first surface and a second surface, which respectively comprise a part of the first surface and a part of the second surface of the mirror structure, the movable plate having a first surface and a second surface, which respectively comprise a part of the first surface and a part of the second surface of the mirror structure, and the movable plate having a mirror surface on the second surface;
   a single plate base for holding the mirror structure, the mirror structure and the base being individual elements, the base having an opening for exposing the mirror surface, the base having bonding portions projecting from the base, the bonding portions being located on each of two opposing sides of the opening, and the supports of the mirror structure being fixed to the bonding portions of the base by adhesion with the second surfaces of the supports in contact with the bonding portions, so that the mirror structure is positioned remote from the base; and
   driving means for driving the mirror structure, the driving means including a conductive element formed on the first surface of the movable plate and a magnetic circuit, the magnetic circuit comprising a pair of magnetic field generating elements and a yoke of magnetic material connecting the magnetic field generating elements, the magnetic circuit being mounted only-on the same side of the base on which the mirror structure is mounted, the mirror structure being fixed to the bonding portions so as to be offset from the base and the conductive element being positioned so as to overlap the magnetic field generating elements as viewed from a direction parallel to the first and second surfaces of the mirror structure, and at least a part of the yoke is disposed in the vicinity of the first surface of the movable plate.

2. The optical deflector according to claim 1, wherein the supports include electrode pads electrically connected to the conductive element, the base includes wiring materials for electric connection to the outside, the wiring materials have connection portions electrically connected to the electrode pads, and the electrode pads are electrically connected to the connection portions by wire bonding.

3. The optical deflector according to claim 2, wherein the base comprises a main substrate having the opening, and a rigid substrate fixed to the main substrate, and the wiring materials are formed on the rigid substrate.

4. The optical deflector according to claim 3, wherein the rigid substrate is within the main substrate.

5. The optical deflector according to claim 3, wherein the main substrate has conductivity, the wiring materials include a ground wiring for grounding, and the ground wiring is electrically connected to the main substrate.

6. The optical deflector according to claim 3, wherein the base further comprises a flexible substrate formed integrally with the rigid substrate.

7. The optical deflector according to claim 3, wherein the base further comprises a flexible lead wire connected to the wiring materials of the rigid substrate.

8. The optical deflector according to claim 1, wherein the conductive element comprises a coil disposed along a peripheral edge of the movable plate.

9. The optical deflector according to claim 1, wherein the opening of the base has a size that does not intercept a light beam incident upon the mirror surface of a time when the movable plate is parallel to the base at an incidence angle of 45° over a full effective width of the mirror surface, and the magnetic field generating elements are located not to intercept the light beam incident upon the mirror surface of the time when the movable plate is parallel to the base at the incidence angle of 45° over the full effective width of the mirror surface.

10. The optical deflector according to claim 9, wherein the magnetic field generating elements are located interposing the conductive element formed on the first surface of the movable plate, and a mirror surface effective width $w_m$, interval $w_p$ of the magnetic field generating elements, base opening width $w_b$, height $h_p$ of the magnetic field generating elements with respect to the mirror surface, and height $h_b$ of an upper surface of the base opening with respect to the mirror surface satisfy conditions: $w_p > w_m + 2h_p$; and $w_b > w_m + 2h_b$.

11. An optical deflector comprising:
a mirror structure having a first surface and a second surface which are in a front/back relation, the mirror structure comprising a pair of supports, a movable plate which is moved with respect to the supports, and a pair of elastic members for connecting the movable plate and the supports, such that the movable plate is able to rock with respect to the supports about the pair of elastic members as a rocking axis, the supports having a first surface and a second surface, which respectively comprise a part of the first surface and a part of the second surface of the mirror structure, the movable plate having a first surface and a second surface, which respectively comprise a part of the first surface and a part of the second surface of the mirror structure, and the movable plate having a mirror surface on the second surface;
a single plate base for holding the mirror structure, the mirror structure and the base being individual elements, the base having an opening for exposing the mirror surface, the base having bonding portions projecting from the base, the bonding portions being located on each of two opposing sides of the opening, and the supports of the or structure being fixed to the bonding portions of the base by adhesion with the second surfaces of the supports in contact with the bonding portions, so that the mirror structure is positioned remote from the base; and
a driver for driving the mirror structure, the driver a coil formed on the first surface of the movable plate and a magnetic circuit, the magnetic circuit comprising a pair of permanent magnets and a yoke of magnetic material connecting the permanent magnets, the magnetic circuit being mounted only on the same side of the base on which the mirror structure is mounted, the mirror structure being fixed to the bonding portions so as to be offset from the base, and the coil being positioned so as to overlap the permanent magnets as viewed from a direction parallel to the first and second surfaces of the mirror structure, and at least a part of the yoke is disposed in the vicinity of the first surface of the movable plate.

12. The optical deflector according to claim 11, wherein the opening of the base has a size that does not intercept a light beam incident upon the mirror surface of a time when the movable plate is parallel to the base at an incidence angle of 45° over a full effective width of the mirror surface, and the permanent magnets are located not to intercept the light beam incident upon the mirror surface of the time when the movable plate is parallel to the base at the incidence angle of 45° over the full effective width of the mirror surface.

13. The optical deflector according to claim 12, wherein the permanent magnets are located interposing the coil formed on the first surface of the movable plate, and a mirror surface effective width $w_m$, permanent magnet interval $w_p$, base opening width $w_b$, height $h_p$ of the permanent magnet with respect to the mirror surface, and height $h_b$ of an upper surface of the base opening with respect to the mirror surface satisfy conditions: $w_p > w_m + 2h_p$; and $w_b > w_m + 2h_b$.

* * * * *